US012810804B2

(12) United States Patent
Choi et al.

(10) Patent No.: US 12,810,804 B2
(45) Date of Patent: Nov. 24, 2026

(54) PIXEL CIRCUIT AND DISPLAY DEVICE INCLUDING THE SAME

(71) Applicant: Samsung Display Co., Ltd., Yongin-si (KR)

(72) Inventors: Jung-Mi Choi, Seoul (KR); Young-In Hwang, Suwon-si (KR); Eung Taek Kim, Hwaseong-si (KR); Yong Ho Yang, Suwon-si (KR); Joo Hyeon Jo, Hwaseong-si (KR); Seong Baik Chu, Busan (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/008,276

(22) Filed: Jan. 2, 2025

(65) Prior Publication Data

US 2025/0166569 A1 May 22, 2025

Related U.S. Application Data

(63) Continuation of application No. 17/028,384, filed on Sep. 22, 2020, now Pat. No. 12,249,284.

(30) Foreign Application Priority Data

Sep. 24, 2019 (KR) ........................ 10-2019-0117289

(51) Int. Cl.

| | |
|---|---|
| ***G09G 3/3258*** | (2016.01) |
| *G09G 3/3266* | (2016.01) |
| *G09G 3/3275* | (2016.01) |

(52) U.S. Cl.

CPC ......... *G09G 3/3258* (2013.01); *G09G 3/3266* (2013.01); *G09G 3/3275* (2013.01);

(Continued)

(58) Field of Classification Search

CPC .. G09G 3/3258; G09G 3/3266; G09G 3/3275; G09G 2300/0871;

(Continued)

(56) References Cited

U.S. PATENT DOCUMENTS

| | | | | |
|---|---|---|---|---|
| 6,243,061 | B1 | 6/2001 | Sandoe et al. | |
| 7,317,434 | B2 * | 1/2008 | Lan ...................... | G09G 3/3233 345/82 |

(Continued)

FOREIGN PATENT DOCUMENTS

| | | | |
|---|---|---|---|
| CN | 102890910 | A | 1/2013 |
| CN | 107358915 | A | 11/2017 |

(Continued)

OTHER PUBLICATIONS

Korean Office Action with English translation for Korean Patent Application No. 10-2019-0117289, dated Apr. 1, 2024.

(Continued)

*Primary Examiner* — Jose R Soto Lopez

(74) *Attorney, Agent, or Firm* — F. CHAU & ASSOCIATES, LLC

(57) ABSTRACT

Provided are a pixel circuit and a display device having the pixel circuit. The pixel circuit includes an organic light emitting diode, a switching transistor, a storage capacitor, and a driving transistor. The switching transistor is turned off when a scan signal has a first voltage and turned on when the scan signal has a second voltage. The storage capacitor stores a data voltage when the switching transistor is turned on in response to the scan signal. The driving transistor is electrically connected with the organic light emitting diode between a high power supply voltage and a low power supply voltage to provide a driving current to the organic light emitting diode, and includes a first bottom gate electrode that is provided with the first voltage. The driving (Continued)

current corresponds to the data voltage stored in the storage capacitor.

9 Claims, 6 Drawing Sheets

(52) U.S. Cl.
CPC ............... *G09G 2300/0871* (2013.01); *G09G 2310/0202* (2013.01); *G09G 2310/08* (2013.01); *G09G 2320/0257* (2013.01); *G09G 2330/02* (2013.01)

(58) Field of Classification Search
CPC ....... G09G 2310/0202; G09G 2310/08; G09G 2320/0257; G09G 2330/02; G09G 2300/0819; G09G 2300/0842; G09G 2300/0861; G09G 2320/0214; G09G 3/3233; G09G 3/3208; G09G 3/3291; G09G 2300/0404; G09G 2300/0439; G09G 2300/0809
See application file for complete search history.

(56) References Cited

U.S. PATENT DOCUMENTS 7,545,348 B2* 6/2009 Tseng ................... G09G 3/3233 345/82
9,870,735 B2 1/2018 Lim et al.
10,002,972 B2 6/2018 Miyake
10,056,037 B1 8/2018 Nie
10,068,524 B2 9/2018 Yang et al.
10,366,656 B2 7/2019 Jeon et al.
10,621,911 B2* 4/2020 Onoyama ............ G09G 3/3233
10,748,486 B2 8/2020 Teraguchi
10,777,128 B2 9/2020 Feng et al.
10,783,818 B2 9/2020 Tsao et al.
10,878,744 B2 12/2020 Cheng et al.
2002/0093474 A1 7/2002 Toyoshima et al.
2002/0171615 A1* 11/2002 Inoue ................... G09G 3/3688 345/92
2004/0174349 A1* 9/2004 Libsch ................. G09G 3/3233 257/E27.111
2005/0122297 A1* 6/2005 Imagawa ............... G09G 3/006 345/89
2006/0027807 A1 2/2006 Nathan et al.
2006/0066512 A1* 3/2006 Afentakis ................ G09G 3/20 345/55
2007/0114530 A1 5/2007 Kimura
2007/0139314 A1 6/2007 Park
2007/0152934 A1* 7/2007 Maeda ................. G09G 3/3233 345/92
2008/0094531 A1 4/2008 Lee et al.
2009/0051674 A1 2/2009 Kimura et al.
2009/0201231 A1* 8/2009 Takahara ............. G09G 3/3233 345/76
2010/0026619 A1 2/2010 Umezaki
2010/0103160 A1* 4/2010 Jeon ..................... G09G 3/3233 345/82
2010/0182068 A1 7/2010 Lee et al.
2011/0068829 A1 3/2011 Ogawa et al.
2011/0122324 A1 5/2011 Yamashita et al.
2011/0128269 A1 6/2011 Lee et al.
2011/0148937 A1* 6/2011 Park ..................... G09G 3/3233 345/76
2011/0273419 A1 11/2011 Park et al.
2012/0249510 A1 10/2012 Jankovic et al.
2012/0313923 A1 12/2012 Minami et al.
2012/0320004 A1 12/2012 Kitakado
2013/0293594 A1* 11/2013 Kang ....................... G09G 5/10 345/690
2015/0042635 A1* 2/2015 Kimura ................ G09G 3/3266 345/212
2015/0084946 A1 3/2015 Shim et al.
2015/0138253 A1* 5/2015 Kimura .................... G09G 3/30 345/77
2015/0171156 A1 6/2015 Miyake
2015/0187276 A1 7/2015 Shim et al.
2015/0194092 A1 7/2015 Ma
2015/0279304 A1* 10/2015 Yoneyama ............. H03K 3/012 345/98
2016/0042694 A1 2/2016 Lim et al.
2016/0063955 A1 3/2016 Yamamoto et al.
2016/0104424 A1 4/2016 Lim et al.
2016/0189619 A1 6/2016 Park et al.
2016/0329392 A1 11/2016 Miyake
2017/0011675 A1 1/2017 Spevak
2017/0038894 A1* 2/2017 Jeong .................... G06F 3/0412
2017/0115810 A1* 4/2017 Takano ............... G06F 3/04184
2017/0294156 A1 10/2017 Pyo et al.
2017/0337875 A1* 11/2017 Jeon ..................... G09G 3/3233
2017/0352313 A1 12/2017 Miyake
2017/0365213 A1* 12/2017 Rieutort-Louis .... G09G 3/3233
2018/0011053 A1 1/2018 Hadwen et al.
2018/0018918 A1 1/2018 Miyake
2018/0061307 A1 3/2018 Inoue et al.
2018/0102397 A1 4/2018 Nie
2018/0130418 A1 5/2018 Zhu et al.
2018/0145123 A1 5/2018 Kim et al.
2018/0158406 A1 6/2018 Kim et al.
2018/0166585 A1* 6/2018 Takechi ................... G09G 3/20
2018/0174647 A1 6/2018 Takahashi et al.
2018/0190194 A1 7/2018 Zhu et al.
2018/0190824 A1 7/2018 Bae et al.
2018/0197474 A1 7/2018 Jeon et al.
2018/0203537 A1* 7/2018 Kim ...................... G06F 3/0412
2018/0204532 A1* 7/2018 Kobayashi ............. G02B 27/01
2018/0233082 A1 8/2018 Wang et al.
2019/0019458 A1* 1/2019 Teraguchi ............ G09G 3/3233
2019/0114963 A1 4/2019 Choi et al.
2019/0123124 A1* 4/2019 Tamura ..................... G09F 9/30
2019/0131372 A1* 5/2019 Toyomura ................. G09F 9/30
2019/0164504 A1* 5/2019 Hayashi ................. G09G 3/344
2019/0180692 A1* 6/2019 Fujii .................... G09G 3/3266
2019/0197957 A1* 6/2019 Miura .................. H10K 59/121
2019/0266941 A1* 8/2019 Pyo ...................... G09G 3/3225
2019/0326549 A1 10/2019 Kokame et al.
2019/0362674 A1 11/2019 Xu
2020/0012369 A1 1/2020 Guo et al.
2020/0035148 A1* 1/2020 Xuan ....................... G09G 3/32
2020/0049839 A1 2/2020 Zhang et al.
2020/0051520 A1 2/2020 Shan
2020/0175929 A1 6/2020 Chen et al.
2020/0185481 A1 6/2020 Park et al.
2020/0194594 A1 6/2020 Ko et al.
2020/0219446 A1 7/2020 Yoshida
2020/0258452 A1* 8/2020 Feng .................... G09G 3/3233
2020/0312266 A1 10/2020 Sainis et al.
2021/0027709 A1* 1/2021 Nishiyama ........... G09G 3/3233
2021/0043139 A1 2/2021 Cha et al.
2021/0110766 A1* 4/2021 Toyoda ................ G09G 3/3225
2021/0201761 A1* 7/2021 Yin .......................... G09G 3/32
2021/0398487 A1* 12/2021 Toyoda ..................... G09F 9/30
2022/0044604 A1* 2/2022 Yin ...................... G09G 3/3208
2022/0084466 A1* 3/2022 Takatori ............... G09G 3/3233
2023/0087472 A1* 3/2023 Xu ........................... G09G 3/32 345/691

FOREIGN PATENT DOCUMENTS

CN 108682392 A 10/2018
CN 108711398 B 4/2020
KR 10-2005-0119367 12/2005
KR 10-2017-0087079 7/2017
KR 10-2017-0132016 12/2017
KR 10-2018-0024909 3/2018
KR 10-2018-0032256 3/2018
KR 10-2018-0047579 5/2018
KR 10-2578840 9/2023

(56) References Cited

OTHER PUBLICATIONS

Korean Notice of Allowance with English translation for Korean Patent Application No. 10-2019-0117289, dated Dec. 11, 2024.
Office Action dated Jul. 19, 2025 in related Chinese Patent Application No. 202011016401.8 (in Chinese), 9 pages.
Office Action dated Jan. 23, 2026 from the Chinese Patent Office for corresponding Chinese Patent Application No. 202011016401.8.

* cited by examiner

PDA:GDV,DDV,EDV,PD

PIXEL CIRCUIT AND DISPLAY DEVICE INCLUDING THE SAME

CROSS-REFERENCE TO RELATED APPLICATION(S)

This is a continuation application of U.S. patent application Ser. No. 17/028,384 filed Sep. 22, 2020 (now pending), the disclosure of which is incorporated herein by reference in its entirety. U.S. patent application Ser. No. 17/028,384 claims priority to and benefits of Korean Patent Application No. 10-2019-0117289 under 35 U.S.C. § 119, filed on Sep. 24, 2019 in the Korean Intellectual Property Office, the entire contents of which are incorporated herein by reference.

BACKGROUND

1. Technical Field

Embodiments relate generally to a pixel circuit and a display device including the same.

2. Description of the Related Art

An organic light emitting display device is recently being mainly studied among the various types of display devices. The organic light emitting display device may include pixel circuits, and each of the pixel circuits may include thin film transistors, at least one capacitor, and at least one organic light emitting diode.

The thin film transistors may include a driving transistor that may provide a driving current to the organic light emitting diode and a switching transistor which may be turned on or turned off in response to a scan signal to transfer a data voltage to the driving transistor. Meanwhile, as a leakage current of the driving transistor increases when the pixel circuit is driving, an instantaneous afterimage of the display device may occur.

As an example, as the on/off characteristic of the switching transistor which transfers the data voltage is deteriorated, a reliability of the display device may be deteriorated.

To solve these problems, a technology has been proposed to shift a threshold voltage of the thin film transistor by adding a bottom gate electrode to a bottom of the thin film transistor and applying a back-biasing voltage to the bottom gate electrode when the pixel circuit is driving. However, the technology may require an additional voltage source for applying the back-biasing voltage, so that a non-display area of the display device may be increased. As an example, since a voltage level of the back-biasing voltage may be low, there may be a limit to improving the instantaneous afterimage and thus ensuring the reliability of the display device.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Some embodiments provide a pixel circuit that may improve an instantaneous afterimage and may ensure a reliability of a display device.

Some embodiments provide the display device including the pixel circuit.

According to an embodiment, a pixel circuit may include an organic light emitting diode, a switching transistor, a storage capacitor and a driving transistor. The switching transistor may be turned off when a scan signal has a first voltage and may be turned on when the scan signal has a second voltage. The storage capacitor may store a data voltage provided through a data line when the switching transistor is turned on in response to the scan signal. The driving transistor may provide a driving current to the organic light emitting diode, and the driving current may correspond to the data voltage stored in the storage capacitor. The driving transistor may be electrically connected with the organic light emitting diode between a high power supply voltage and a low power supply voltage, and the driving transistor may include a first bottom gate electrode that may be provided with the first voltage.

In an embodiment, the first voltage may have a positive voltage level, the driving transistor may be a PMOS (p-channel metal oxide semiconductor) transistor, and a voltage level of a threshold voltage of the driving transistor may be moved in a negative direction when the first voltage is provided to the first bottom gate electrode.

In an embodiment, the high power supply voltage may have a voltage level higher than a voltage level of the low power supply voltage, and the first voltage may have a voltage level higher than a voltage level of the high power supply voltage.

According to an embodiment, a pixel circuit may include an organic light emitting diode, a switching transistor, a storage capacitor, and a driving transistor. The switching transistor may be turned off when a scan signal has a first voltage and may be turned on when the scan signal has a second voltage. The storage capacitor may store a data voltage provided through a data line when the switching transistor is turned on in response to the scan signal. The driving transistor may provide a driving current to the organic light emitting diode, and the driving current may correspond to the data voltage stored in the storage capacitor. The driving transistor may be electrically connected with the organic light emitting diode between a high power supply voltage and a low power supply voltage. The switching transistor may include a second bottom gate electrode that may be provided with the first voltage.

In an embodiment, the first voltage may have a positive voltage level, the switching transistor may be a PMOS transistor, and a voltage level of a threshold voltage of the switching transistor may be moved in a negative direction when the first voltage is provided to the second bottom gate electrode.

In an embodiment, the high power supply voltage may have a voltage level higher than a voltage level of the low power supply voltage, and the first voltage may have a voltage level higher than the voltage level of the high power supply voltage.

In an embodiment, the driving transistor may include a first bottom gate electrode provided with the first voltage.

In an embodiment, the first voltage may have a positive voltage level, the driving transistor may be a PMOS transistor, and a voltage level of a threshold voltage of the driving transistor may be moved in a negative direction when the first voltage is provided to the first bottom gate electrode.

In an embodiment, the switching transistor may be the PMOS transistor, and a voltage level of a threshold voltage of the switching transistor may be moved in a negative direction when the first voltage is provided to the first bottom gate electrode.

In an embodiment, the high power supply voltage may have a voltage level higher than a voltage level of the low power supply voltage, and the first voltage may have a voltage level higher than the voltage level of the high power supply voltage.

According to an embodiment, a display device may include a display panel including a plurality of pixel circuits and a panel driving part. The panel driving part may provide a scan signal, a data voltage, a high power supply voltage, and a low power supply voltage to the display panel. Each of the plurality of pixel circuits may include an organic light emitting diode, a switching transistor, a storage capacitor, and a driving transistor. The switching transistor may be turned off when the scan signal has a first voltage and may be turned on when the scan signal has a second voltage. The storage capacitor may store the data voltage provided through a data line when the switching transistor is turned on in response to the scan signal. The driving transistor may provide a driving current to the organic light emitting diode, and the driving current may correspond to the data voltage stored in the storage capacitor. The driving transistor may include a first bottom gate electrode that may be provided with the first voltage.

In an embodiment, the first voltage may have a positive voltage level, the driving transistor may be a PMOS transistor, and a voltage level of a threshold voltage of the driving transistor may be moved in a negative direction when the first voltage is provided to the first bottom gate electrode.

In an embodiment, the high power supply voltage may have a voltage level higher than a voltage level of the low power supply voltage, and the first voltage may have a voltage level higher than the voltage level of the high power supply voltage.

According to an embodiment, a display device may include a display panel including a plurality of pixel circuits, and a panel driving part. The panel driving part may provide a scan signal, a data voltage, a high power supply voltage, and a low power supply voltage to the display panel. Each of the plurality of pixel circuits may include an organic light emitting diode, a switching transistor, a storage capacitor, and a driving transistor. The switching transistor may be turned off when the scan signal has a first voltage and may be turned on when the scan signal has a second voltage. The storage capacitor may store the data voltage provided through a data line when the switching transistor is turned on in response to the scan signal. The driving transistor may provide a driving current to the organic light emitting diode, and the driving current may correspond to the data voltage stored in the storage capacitor. The switching transistor may include a second bottom gate electrode that may be provided with the first voltage.

In an embodiment, the first voltage may have a positive voltage level, the switching transistor may be a PMOS transistor, and a voltage level of a threshold voltage of the switching transistor may be moved in a negative direction when the first voltage is provided to the second bottom gate electrode.

In an embodiment, the high power supply voltage may have a voltage level higher than a voltage level of the low power supply voltage, and the first voltage may have a voltage level higher than the voltage level of the high power supply voltage.

In an embodiment, the driving transistor may include a first bottom gate electrode that may be provided with the first voltage.

In an embodiment, the first voltage may have a positive voltage level, the driving transistor may be a PMOS transistor, and a voltage level of a threshold voltage of the driving transistor may be moved in a negative direction when the first voltage is provided to the first bottom gate electrode.

In an embodiment, the switching transistor may be the PMOS transistor, and a voltage level of a threshold voltage of the switching transistor may be moved in a negative direction when the first voltage is provided to the second bottom gate electrode.

In an embodiment, the high power supply voltage may have a voltage level higher than a voltage level of the low power supply voltage, and the first voltage may have a voltage level higher than the voltage level of the high power supply voltage.

Therefore, a pixel circuit according to embodiments may include a driving transistor including a first bottom gate that may be provided with a first voltage. Accordingly, the pixel circuit may apply the first voltage that may generate a scan signal to the first bottom gate of the driving transistor without adding a separate voltage source so that a threshold voltage of the driving transistor may be shifted. Therefore, an instantaneous afterimage of a display device including the pixel circuit may not occur, and a separate voltage source may not be added to a non-display area of the display device.

Therefore, a pixel circuit according to embodiments may include a switching transistor including a second bottom gate that may be provided with a first voltage. Accordingly, the pixel circuit may apply the first voltage that may generate a scan signal to the second bottom gate of the switching transistor without adding a separate voltage source so that a threshold voltage of the switching transistor may be shifted. Therefore, a reliability of a display device including the pixel circuit may be ensured, and a separate voltage source may not be added to a non-display area of the display device.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Figure 1:
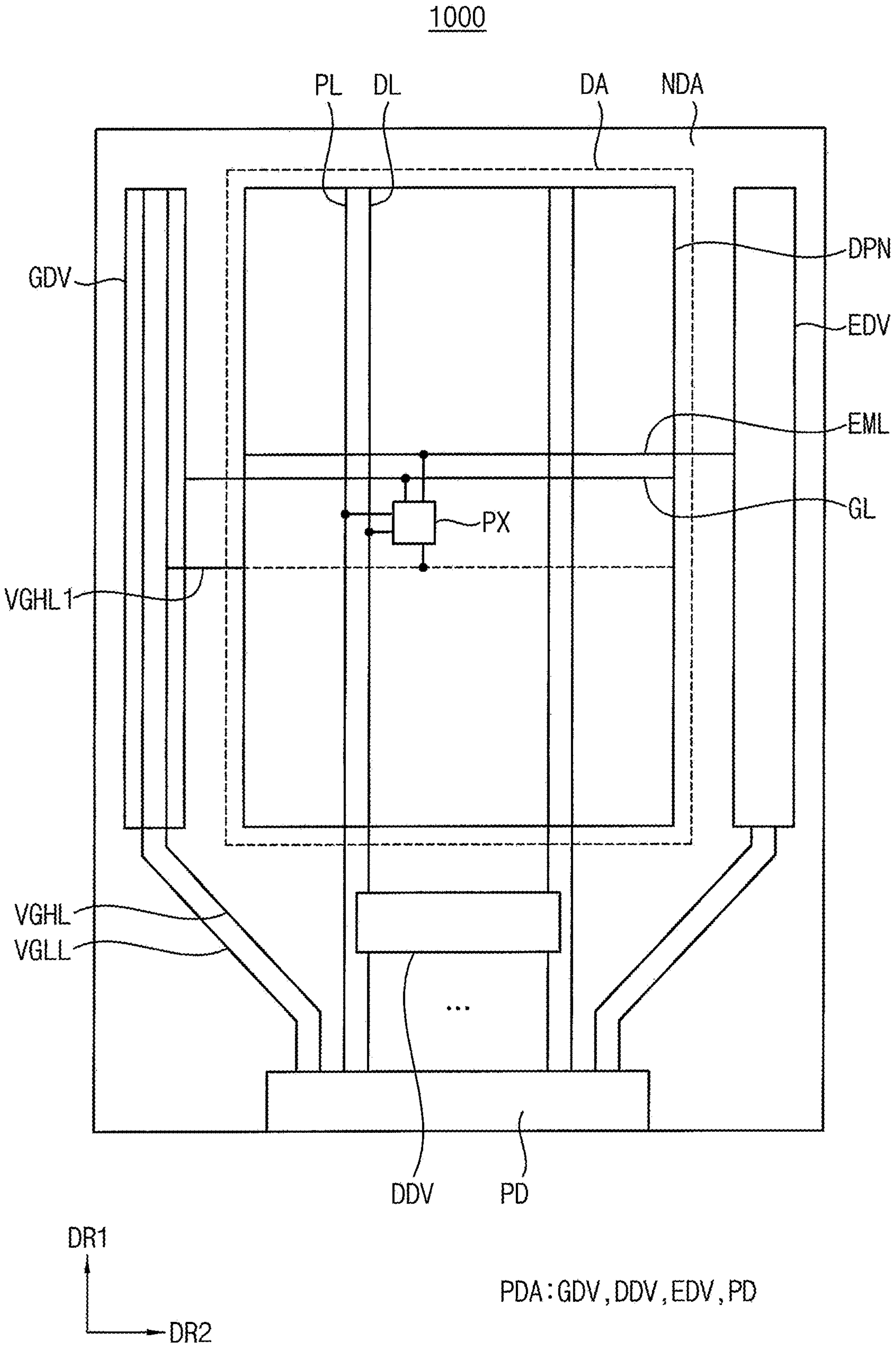
FIG. 1 is a diagram illustrating a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Some of the parts which are not associated with the description may not be provided in order to describe embodiments of the disclosure and like reference numerals refer to like elements throughout the specification.

As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that although the terms such as 'first' and 'second' are used herein to describe various elements, these elements should not be limited by these terms. It will be understood that although the terms such as 'first' and 'second' are used herein to describe various elements, these elements should not be limited by these terms. For example, a first element referred to as a first element in one embodiment may be referred to as a second element in another embodiment without departing from the scope of the appended claims.

As used herein, the singular forms "a," "an," and "the" are intended to include the plural forms as well, unless the context clearly indicates otherwise.

It will be further understood that when the terms "comprises," "comprising," "includes" and/or "including", "have" and/or "having" are used in this specification, they or it may specify the presence of stated features, integers, steps, operations, elements and/or components, but do not preclude the presence or addition of other features, integers, steps, operations, elements, components, and/or any combination thereof.

When a layer, film, region, substrate, or area, or element is referred to as being "on" another layer, film, region, substrate, or area, or element, it may be directly on the other film, region, substrate, or area, or element, or intervening films, regions, substrates, or areas, or elements may be present therebetween. Conversely, when a layer, film, region, substrate, or area, or element, is referred to as being "directly on" another layer, film, region, substrate, or area, or element, intervening layers, films, regions, substrates, or areas, may be absent therebetween. Further when a layer, film, region, substrate, or area, or element, is referred to as being "below" another layer, film, region, substrate, or area, or element, it may be directly below the other layer, film, region, substrate, or area, or element, or intervening layers, films, regions, substrates, or areas, or elements, may be present therebetween. Conversely, when a layer, film, region, substrate, or area, or element, is referred to as being "directly below" another layer, film, region, substrate, or area, or element, intervening layers, films, regions, substrates, or areas, or elements may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

In the drawings, sizes and thicknesses of elements may be enlarged for better understanding, clarity, and ease of description thereof. However, the disclosure is not limited to the illustrated sizes and thicknesses. In the drawings, the thicknesses of layers, films, panels, regions, and other elements, may be exaggerated for clarity. In the drawings, for better understanding and ease of description, the thicknesses of some layers and areas may be exaggerated.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

Further, in the specification, the phrase "in a plan view" means when an object portion is viewed from above, and the phrase "in a schematic cross-sectional view" means when a schematic cross-section taken by vertically cutting an object portion is viewed from the side.

It will be understood that when a layer, region, or component is referred to as being "connected" or "coupled" to another layer, region, or component, it may be "directly connected" or "directly coupled" to the other layer, region, or component and/or may be "indirectly connected" or "indirectly coupled" to the other layer, region, or component with other layers, regions, or components interposed therebetween. For example, it will be understood that when a layer, region, or component is referred to as being "electrically connected" or "electrically coupled" to another layer, region, or component, it may be "directly electrically connected" or "directly electrically coupled" to the other layer, region, or component and may be "indirectly electrically connected" or "indirectly electrically coupled" to the other layer, region, or component with other layers, regions, or components interposed therebetween.

Also, when an element is referred to as being "in contact" or "contacted" or the like to another element, the element may be in "electrical contact" or in "physical contact" with another element; or in "indirect contact" or in "direct contact" with another element.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

In the following examples, the x-axis, the y-axis and the z-axis are not limited to three axes of the rectangular coordinate system, and may be interpreted in a broader sense. For example, the x-axis, the y-axis, and the z-axis are perpendicular to one another, or may represent different directions that are not perpendicular to one another.

Unless otherwise defined, all terms (including technical and scientific terms) used herein have the same meaning as commonly understood by one of ordinary skill in the art to which embodiments pertain. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
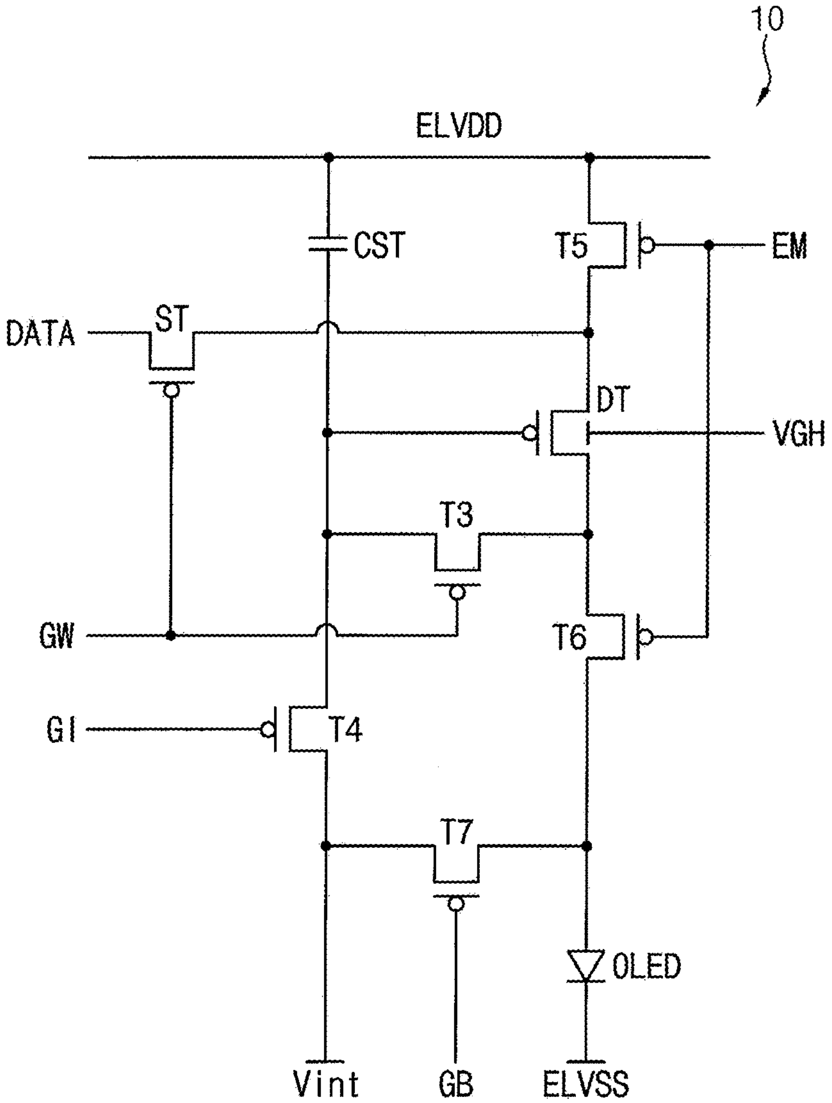
FIG. 2 is a diagram illustrating an example of an equivalent pixel circuit diagram included the display device of FIG. 1.
Figure 3:
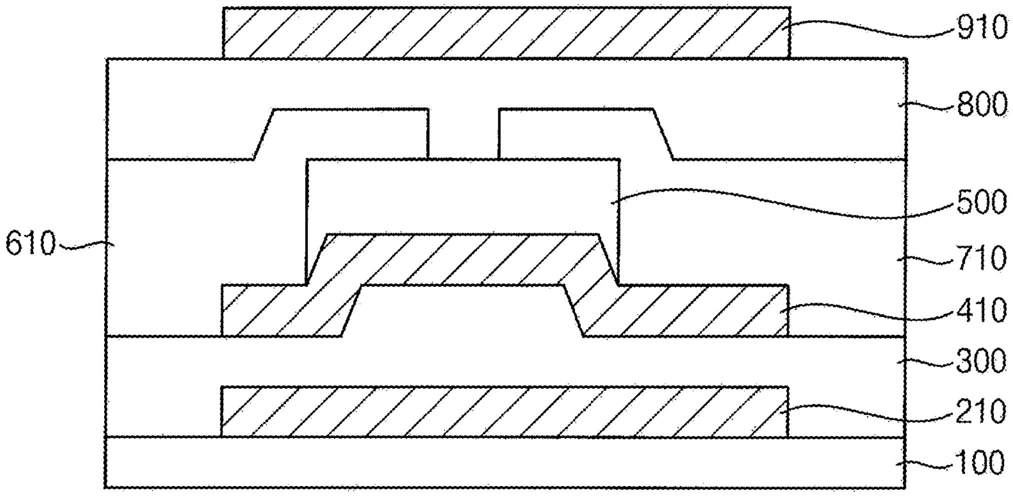
FIG. 3 is a schematic cross-sectional view illustrating an embodiment of a driving transistor included the pixel circuit of FIG. 2.

FIG. 1 is a diagram illustrating a display device according to embodiments. FIG. 2 is a diagram illustrating an embodiment of a pixel circuit included the display device of FIG. 1. FIG. 3 is a schematic cross-sectional view illustrating an embodiment of a driving transistor included the pixel circuit of FIG. 2.

Referring to FIGS. 1, 2, and 3, a display device 1000 may include a display panel DPN disposed in a display area DA, and a panel driving part PDA disposed in a non-display area NDA.

The display panel DPN may include a pixel circuit 10 (or PX), a data line DL, a gate line GL, an emission managing line EML, a power line PL, an initialization managing line (not shown), an initialization voltage providing line (not shown), and bypass line (not shown). The above-described lines may be electrically connected to the pixel circuit 10.

The data line DL may be electrically connected to a data driver DDV and may extend along a first direction DR1. The data line DL may be electrically connected to the pixel circuit 10 so that the data line DL may transfer a data voltage DATA from the data driver DDV to the pixel circuit 10.

The gate line GL may be electrically connected to a gate driver GDV and may extend along a second direction DR2 intersecting the first direction DR1. The gate line GL may be electrically connected to the pixel circuit 10 so that the gate line GL may transfer a scan signal GW from the gate driver GDV to the pixel circuit 10.

The emission managing line EML may be electrically connected to an emission driver EDV and may extend along the second direction DR2 in parallel with the gate line GL. The emission managing line EML may be electrically connected to the pixel circuit 10 so that the emission managing line EML may transfer an emission managing signal EM from the emission driver EDV to the pixel circuit 10.

The power line PL may be electrically connected to a pad part PD and may extend along the first direction DR1 in parallel with the data line DL. The power line PL may be electrically connected to the pixel circuit 10 so that the power line PL may transfer a high power supply voltage ELVDD from the pad part PD to the pixel circuit 10. A low power supply voltage ELVSS may be provided to a common electrode (for example, a cathode electrode) of an organic light emitting diode OLED.

The panel driving part PDA may include the gate driver GDV, the data driver DDV, the emission driver EDV, and the pad part PD. As an example, the panel driving part PDA may include a timing controller, and the timing controller may control the gate driver GDV, the data driver DDV, and the emission driver EDV.

The gate driver GDV may generate the scan signal GW using a first voltage VGH and a second voltage VGL which may be provided through a first voltage line VGHL and a second voltage line VGLL, respectively. Therefore, the scan signal GW may have the first voltage VGH that turns off a switching transistor ST and a second voltage VGL that turns on the switching transistor ST, and may be provided to the pixel circuit 10 through the gate line GL. As an example, the panel driving part PDA may provide an initialization managing signal GI and a bypass signal GB to the pixel circuit 10. In an example embodiment, the gate driver GDV may provide the initialization managing signal GI and the bypass signal GB to the pixel circuit 10 through the gate line GL.

The data driver DDV may provide the data voltage DATA to the pixel circuit 10 through the data line DL. The emission driver EDV may provide the emission managing signal EM to the pixel circuit 10 through the emission managing line EML.

The pad part PD may provide the first and second voltages VGH and VGL to the gate driver GDV through the first and second voltage lines VGHL and VGLL, respectively. Each of the first and second voltages VGH and VGL may be a constant voltage having a predetermined voltage level. In an embodiment, in a case that the switching transistor ST is a PMOS (p-channel metal oxide semiconductor) transistor, the first voltage VGH that turns off the switching transistor ST may have a positive voltage level and the second voltage VGL that turns on the switching transistor ST may have the negative voltage level.

Meanwhile, the first voltage VGH may be provided to the pixel circuit 10 through the first voltage line VGHL and an auxiliary voltage line VGHL1. For example, the auxiliary voltage line VGHL1 may be electrically connected to the first voltage line VGHL and may extend along the second direction DR2. This will be described in detail with reference to FIG. 3.

As an example, the pad part PD may provide the high power supply voltage ELVDD to the pixel circuit 10 through the power line PL. In an embodiment, the high power supply voltage ELVDD may have the positive voltage level, and may be higher than the low power supply voltage ELVSS. The low power supply voltage ELVSS may be a constant voltage. For example, the low power supply voltage ELVSS may be a ground voltage or may have a predetermined negative voltage level.

The first and second voltage lines VGHL and VGLL may be disposed in the non-display area NDA of the display device 1000, and may extend along the first direction DR1. The first and second voltage lines VGHL and VGLL may electrically connect the pad part PD and the gate driver GDV so that the first and second voltage VGH and VGL may be transferred from the pad part PD to the gate driver GDV. Accordingly, the gate driver GDV may generate the scan signal GW.

Meanwhile, the gate driver GDV and the emission driver EDV may be respectively disposed on left and right sides of the display device 1000 in FIG. 1, but the disclosure is not limited thereto. In an embodiment, two gate drivers and two emission drivers may be disposed on the left and right sides, respectively. In an embodiment, the emission driver may be omitted. As an example, the data driver DDV and the pad part PD may be disposed in the non-display area NDA of the display device 1000, but the disclosure is not limited thereto. In an embodiment, the data driver DDV may be disposed on an additional flexible printed circuit board (FPCB), and the pad part PD may be electrically connected to the additional FPCB.

The pixel circuit 10 may include a driving transistor DT, the switching transistor ST, a storage capacitor CST and the organic light emitting diode OLED. In an embodiment, the driving transistor DT and the switching transistor ST included in the pixel circuit 10 may be the PMOS transistor or a NMOS (n-channel metal oxide semiconductor) transistor, respectively. As an example, the pixel circuit 10 may include a third transistor T3 that may compensate a threshold voltage of the driving transistor DT, a fourth transistor T4 that may initialize a gate electrode of the driving transistor DT, fifth and sixth transistors T5 and T6 that may control an emission of the organic light emitting diode OLED, and a seventh transistor T7 that may initialize an anode electrode of the organic light emitting diode OLED. For example, an anode electrode of the organic light emitting diode OLED may be initialized with an initialization voltage Vint.

Meanwhile, a connection structure of components included the pixel circuit 10 in FIG. 2 is an example, and the connection structure may be variously changed. For example, in a case that a pixel circuit does not include the third to seventh transistors T3, T4, T5, T6, and T7, the connection structure may be changed to form a connection structure between components (for example, the driving transistor DT, the switching transistor ST, a storage capacitor CST, and the organic light emitting diode OLED) included in the pixel circuit.

The organic light emitting diode OLED may include a first electrode (for example, an anode electrode) and a second electrode (for example, a cathode electrode), the first electrode of the organic light emitting diode OLED may be electrically connected to the driving transistor DT through the sixth transistor T6, and the second electrode may be provided with the low power supply voltage ELVSS. The organic light emitting diode OLED may generate a light having a luminance corresponding to the driving current provided from the driving transistor DT.

The switching transistor ST may be electrically connected between the data line DL and a first electrode of the driving transistor DT so that the switching transistor ST transfers the data voltage DATA to the driving transistor DT. In detail, the switching transistor ST may include a gate electrode, a first electrode, and a second electrode. The gate electrode of the switching transistor ST may be electrically connected to the gate line GL, the first electrode may be electrically connected to the data line DL, and the second electrode may be electrically connected to the first electrode of the driving transistor DT. The switching transistor ST may be turned on or turned off in response to the scan signal GW provided through the gate line GL. In detail, the switching transistor ST may be turned off when the scan signal GW has the first voltage VGH and may be turned on when the scan signal GW has the second voltage VGL. In an embodiment, in a case that the switching transistor ST is the PMOS transistor, the first voltage VGH that turns off the switching transistor ST may be the positive voltage level, and the second voltage VGL that turns on the switching transistor ST may be the negative voltage level. When the switching transistor ST is turned on in response to the scan signal GW having the second voltage VGL, the data voltage DATA provided through the data line DL may be provided to the first electrode of the driving transistor DT. As an example, since the switching transistor ST and the third transistor T3 may respond to a same scan signal GW, the data voltage DATA may be provided during a period in which a threshold voltage of the driving transistor DT may be compensated.

The storage capacitor CST may be electrically connected between the power line PL and the gate electrode of the driving transistor DT, and may store the data voltage DATA. In detail, the storage capacitor CST may include a first electrode and a second electrode. The first electrode of the storage capacitor CST may be electrically connected to the gate electrode of the driving transistor DT, and the second electrode of the storage capacitor CST may be electrically connected to the power line PL. When the switching transistor ST is turned on in response to the scan signal GW having the second voltage VGL, the storage capacitor CST may store the data voltage DATA provided through the data line DL.

As shown in FIG. 3, the driving transistor DT may be the PMOS transistor. For example, the driving transistor DT may have a schematic cross-sectional structure in which a substrate 100, a first bottom gate electrode 210, a first insulating layer 300, an active layer 410, an etch stopper layer 500, a first electrode 610, a second electrode 710, a second insulating layer 800, and a gate electrode 910 may be sequentially formed or disposed.

The substrate 100 may be a silicon semiconductor substrate, a glass substrate, a plastic substrate, and the like within the spirit and the scope of the disclosure.

The first bottom gate electrode 210 may be formed or disposed on the substrate 100, and may overlap the active layer 410. For example, the first bottom gate electrode 210 may be formed by depositing a metal material and patterning the metal material. In an embodiment, the first bottom gate electrode 210 may be electrically connected to the auxiliary voltage line VGHL1, and the auxiliary voltage line VGHL1 may be electrically connected to the first voltage line VGHL, so that the first voltage VGH may be provided to the first bottom gate electrode 210. Accordingly, the display device 1000 may not add an additional voltage source that may provide a back-biasing voltage to the first bottom gate electrode 210, and the first voltage VGH that may generate the scan signal GW may be provided or disposed to the first bottom gate electrode 210 of the driving transistor DT. Therefore, since the display device 1000 may not include the additional voltage source in the non-display area NDA, an unnecessary increase in the size of non-display area NDA may be prevented.

The first insulating layer 300 may be formed or disposed on the first bottom gate electrode 210 and may cover or overlap the first bottom gate electrode 210. The active layer 410 may be formed or disposed on the first insulating layer 300 and may include a channel region, a source region, and a drain region. For example, a central region (for example, a region protruding upward in FIG. 3) may correspond to the channel region, and peripheral regions may correspond to the source and drain regions. The etch stopper layer 500 may be formed or disposed on the active layer 410 and may cover or overlap a portion of the active layer 410. The first and second electrodes 610 and 710 may be formed on the etch stopper layer 500, and may contact exposed source and drain regions of the active layer 410, respectively. The second insulating layer 800 may be formed or disposed on the etch stopper layer 500, and may cover or overlap the first and second electrode 610 and 710.

The gate electrode 910 may be formed or disposed on the second insulating layer 800. For example, the gate electrode 910 may be formed by depositing a metal material and patterning the metal material. Meanwhile, a storage capacitor electrode may be formed or disposed on the gate electrode 910 with an insulating layer interposed therebetween. In this case, the gate electrode 910 may also function as one electrode of the storage capacitor CST by overlapping the storage capacitor electrode. Each of the first and second insulating layers 300 and 800 may be an inorganic insulating layer or an organic insulating layer, and may be formed of a single layer or multiple layers, respectively.

The driving transistor DT may provide the driving current corresponding to the data voltage DATA to the organic light emitting diode OLED. In detail, the gate electrode 910 of the driving transistor DT may be electrically connected to the first electrode of the storage capacitor CST, the first electrode 610 of the driving transistor DT may be electrically connected to the power line PL through the fifth transistor T5, and the second electrode 710 of the driving transistor DT may be electrically connected to the first electrode of the organic light emitting diode OLED through the sixth transistor T6. The driving transistor DT may provide the driving current corresponding to the data voltage DATA stored in the storage capacitor CST to the organic light emitting diode OLED when the fifth and sixth transistors T5 and T6 may be turned on.

In a case that an oxide thin film transistor is the PMOS transistor, if the back-biasing voltage having the positive voltage level is provided to a bottom gate electrode of the oxide thin film transistor, a voltage level of a threshold voltage of the oxide thin film transistor may be moved in a negative direction (in other words, the voltage level of the threshold voltage may be decreased). In a case that the voltage of the threshold voltage of the oxide thin film transistor is moved in the negative direction, an on-current of the oxide thin film transistor may be reduced.

In an embodiment, the driving transistor DT may be the PMOS transistor, and the first voltage VGH may have the positive voltage level. In this case, in a case that the first voltage VGH having the positive voltage level is provided to the first bottom gate electrode 210 of the driving transistor DT, a voltage level of a threshold voltage of the driving transistor DT may be moved in the negative direction. In a case that the voltage level of the threshold voltage of the driving transistor DT is moved in the negative direction, an on-current (in other words, a leakage current) of the driving transistor DT may be reduced. As the leakage current of the driving transistor DT is reduced, an instantaneous afterimage of the display device 1000 may not occur.

In an embodiment, the high power supply voltage ELVDD provided to the driving transistor DT through the power line PL may be higher than the low power supply voltage ELVSS, and the first voltage VGH may be higher than the high power supply voltage ELVDD. Meanwhile, the voltage level of the threshold voltage of the driving transistor DT may be moved in the negative direction even in a case that the high power supply voltage ELVDD having the positive voltage level may be provided to the first bottom gate electrode 210. However, the display device 1000 of the disclosure may provide the first voltage VGH which may be higher than the high power supply voltage ELVDD to the first bottom gate electrode 210 so that the voltage level of the threshold voltage of the driving transistor DT may be moved in the negative direction more than in a case that the high power supply voltage ELVDD may be provided, and the instantaneous afterimage of the display device 1000 may not occur.

Figure 4:
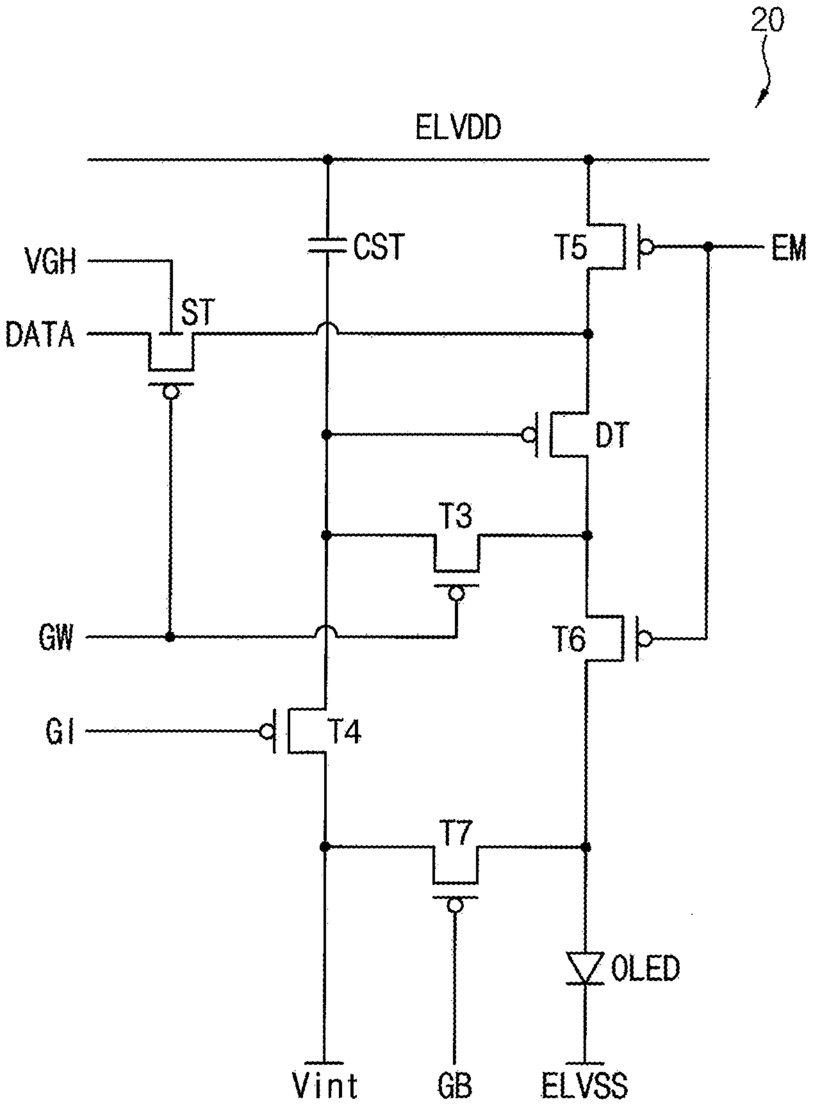
FIG. 4 is a diagram illustrating an embodiment of the pixel circuit included the display device of FIG. 1.
Figure 5:
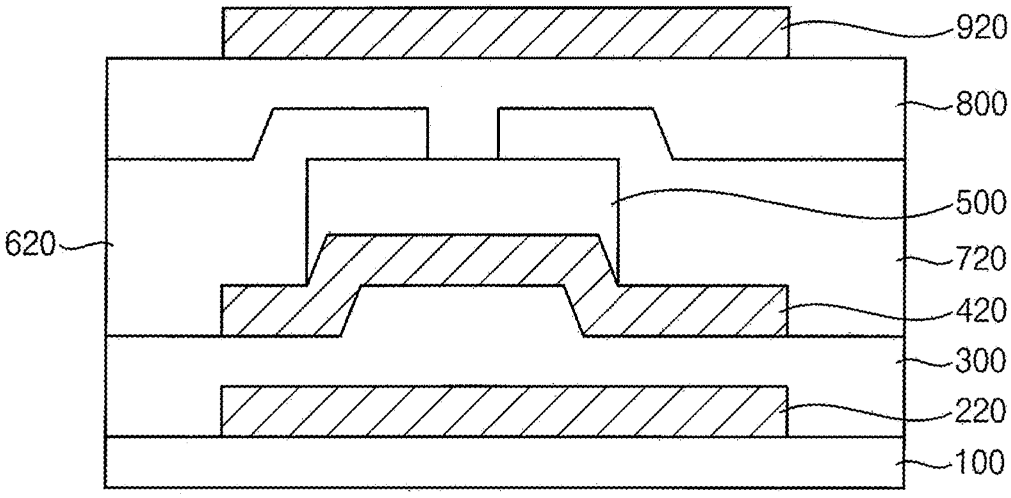
FIG. 5 is a schematic cross-sectional view illustrating an embodiment of a switching transistor included the pixel circuit of FIG. 4.

FIG. 4 is a diagram illustrating an embodiment of the pixel circuit included the display device of FIG. 1. FIG. 5 is a schematic cross-sectional view illustrating an embodiment of a switching transistor included the pixel circuit of FIG. 4.

Referring to FIGS. 1, 4, and 5, a pixel circuit 20 (or PX) may include a driving transistor DT, a switching transistor ST, a storage capacitor CST, and an organic light emitting diode OLED. In an embodiment, the driving transistor DT and the switching transistor ST included in the pixel circuit 20 may be the PMOS transistor or the NMOS transistor, respectively. As an example, the pixel circuit 20 may include a third transistor T3 that may compensate a threshold voltage of the driving transistor DT, a fourth transistor T4 that may initialize a gate electrode of the driving transistor DT, fifth and sixth transistors T5 and T6 that may control an emission of the organic light emitting diode OLED, and a seventh transistor T7 that may initialize an anode electrode of the organic light emitting diode OLED.

Meanwhile, a connection structure of components included the pixel circuit 20 in FIG. 4 is an example, and the connection structure may be variously changed. For example, in a case that a pixel circuit does not include the third to seventh transistors T3, T4, T5, T6, and T7, the connection structure may be changed to form a connection structure between components (for example, the driving transistor DT, the switching transistor ST, the storage capacitor CST, and the organic light emitting diode OLED) included in the pixel circuit.

The organic light emitting diode OLED may include a first electrode (for example, an anode electrode) and a second electrode (for example, a cathode electrode), the first electrode of the organic light emitting diode OLED may be electrically connected to the driving transistor DT through the sixth transistor T6, and the second electrode may be provided with the low power supply voltage ELVSS. The organic light emitting diode OLED may generate a light having a luminance corresponding to the driving current provided from the driving transistor DT.

The storage capacitor CST may be electrically connected between the power line PL and the gate electrode of the driving transistor DT, and may store the data voltage DATA. In detail, the storage capacitor CST may include a first electrode and a second electrode. The first electrode of the storage capacitor CST may be electrically connected to the gate electrode of the driving transistor DT, the second electrode of the storage capacitor CST may be electrically connected to the power line PL. In a case that the switching transistor ST is turned on in response to the scan signal GW having the second voltage VGL, the storage capacitor CST may store the data voltage DATA provided through the data line DL.

The driving transistor DT may provide the driving current corresponding to the data voltage DATA to the organic light emitting diode OLED. In detail, the driving transistor DT may include a gate electrode, a first electrode, and a second electrode. The gate electrode of the driving transistor DT may be electrically connected to the first electrode of the storage capacitor CST, the first electrode of the driving transistor DT may be electrically connected to the power line PL through the fifth transistor T5, and the second electrode of the driving transistor DT may be electrically connected to the first electrode of the organic light emitting diode OLED through the sixth transistor T6. The driving transistor DT may provide the driving current corresponding to the data voltage DATA stored in the storage capacitor CST to the organic light emitting diode OLED when the fifth and sixth transistors T5 and T6 may be turned on.

As shown in FIG. 5, the switching transistor ST may be the PMOS transistor. For example, the switching transistor ST may have a schematic cross-sectional structure in which a substrate 100, a second bottom gate electrode 220, a first insulating layer 300, an active layer 420, an etch stopper layer 500, a first electrode 620, a second electrode 720, a second insulating layer 800, and a gate electrode 920 may be sequentially formed or disposed. However, since the substrate 100, the first insulating layer 300, the etch stopper layer 500, and the second insulating layer 800 of FIG. 5 may be substantially the same as the substrate 100, the first insulating layer 300, the etch stopper layer 500, and the second insulating layer 800 of FIG. 3, a description thereof will be omitted below.

The second bottom gate electrode 220 may be formed or disposes on the substrate 100, and may overlap the active layer 420. The first voltage VGH may be provided to the second bottom gate electrode 220. In an embodiment, the second bottom gate electrode 220 may be electrically connected to the auxiliary voltage line VGHL1, and the auxiliary voltage line VGHL1 may be electrically connected to the first voltage line VGHL, so that the first voltage VGH may be provided to the second bottom gate electrode 220. Accordingly, the display device 1000 may not add an additional voltage source that may provide a back-biasing voltage to the second bottom gate electrode 220, and the first voltage VGH that may generate the scan signal GW may be provided to the second bottom gate electrode 220 of the switching transistor ST. Therefore, since the display device 1000 may not include the additional voltage source in the non-display area NDA, an unnecessary increase in the size of the non-display area NDA may be prevented.

The active layer 420 may be formed or disposed on the first insulating layer 300 and may include a channel region, a source region, and a drain region. The first and second electrodes 620 and 720 may be formed on the etch stopper layer 500, and may contact exposed source and drain regions of the active layer 420, respectively.

The switching transistor ST may be electrically connected between the data line DL and a first electrode of the driving transistor DT so that the switching transistor ST may transfer the data voltage DATA. In detail, the gate electrode of the switching transistor ST may be electrically connected to the gate line GL, the first electrode may be electrically connected to the data line DL, and the second electrode may be electrically connected to the first electrode of the driving transistor DT. When the switching transistor ST is turned on, the data voltage DATA provided through the data line DL may be provided to the first electrode of the driving transistor DT.

In a case that an oxide thin film transistor is the PMOS transistor, if the back-biasing voltage having the positive voltage level may be provided to a bottom gate electrode of the oxide thin film transistor, a voltage level of a threshold voltage of the oxide thin film transistor may be moved in the negative direction (in other words, the voltage level of the threshold voltage may be decreased). In a case that the voltage level of the threshold voltage of the oxide thin film transistor is moved in the negative direction, a hysteresis of the oxide thin film transistor may be improved.

In an embodiment, the switching transistor ST may be the PMOS transistor, and the first voltage VGH may have the positive voltage level. In this case, in a case that the first voltage VGH having the positive voltage level is provided to the second bottom gate electrode 220 of the switching transistor ST, a voltage level of a threshold voltage of the switching transistor ST may be moved in the negative direction. In a case that the voltage level of the threshold voltage of the switching transistor ST may be moved in the negative direction, the hysteresis of the switching transistor ST may be improved. As the hysteresis of the switching transistor ST is improved, the switching transistor ST may more stably transfer the data voltage DATA to the driving transistor DT, and a reliability of the display device 1000 may be ensured.

In an embodiment, the high power supply voltage ELVDD provided to the driving transistor DT through the power line PL may be higher than the low power supply voltage ELVSS, and the first voltage VGH may be higher than the high power supply voltage ELVDD. Meanwhile, the voltage level of the threshold voltage of the switching transistor ST may be moved in the negative direction even in a case that the high power supply voltage ELVDD having the positive voltage level may be provided to the second bottom gate electrode 220. However, the display device 1000 of the disclosure may provide the first voltage VGH which may be higher than the high power supply voltage ELVDD to the second bottom gate electrode 220 so that the voltage level of the threshold voltage of the switching transistor ST may be moved in the negative direction more than in a case that the high power supply voltage ELVDD may be provided, and the reliability of the display device 1000 may be further ensured.

Figure 6:
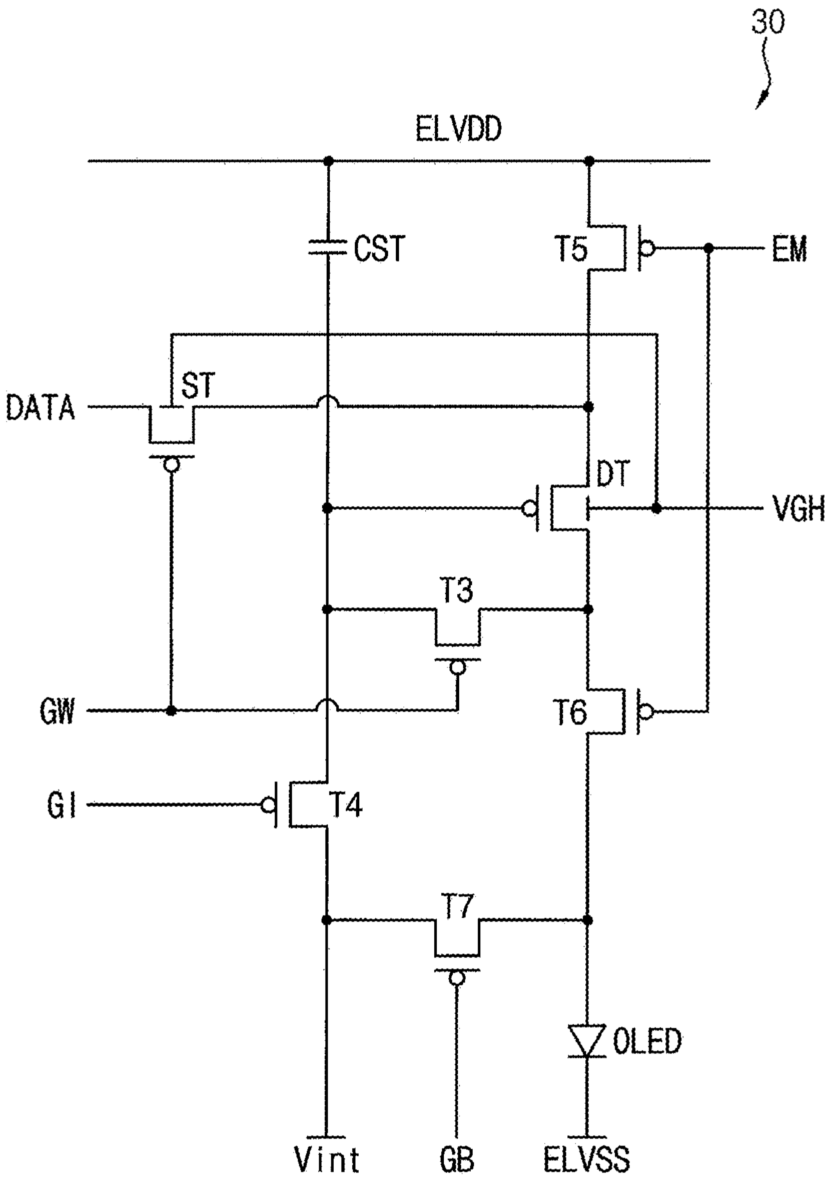
FIG. 6 is a diagram illustrating an embodiment of the pixel circuit included the display device of FIG. 1.

FIG. 6 is an equivalent circuit diagram illustrating an embodiment of the pixel circuit included the display device of FIG. 1.

Referring to FIGS. 1, 3, 5 and 6, a pixel circuit 30 (or PX) may include the driving transistor DT, the switching transistor ST, and the organic light emitting diode OLED. In an embodiment, the driving transistor DT and the switching transistor ST included in the pixel circuit 30 may be the PMOS transistor or the NMOS transistor, respectively. As an example, the pixel circuit 30 may include the third transistor T3 that may compensate a threshold voltage of the driving transistor DT, the fourth transistor T4 that may initialize a gate electrode of the driving transistor DT, fifth and sixth transistors T5 and T6 that may control an emission of the organic light emitting diode OLED, and the seventh transistor T7 that may initialize an anode electrode of the organic light emitting diode OLED.

The driving transistor DT of the pixel circuit 30 may include the first bottom gate electrode 210, and the first voltage VGH may be provided to the first bottom gate electrode 210. As an example, the switching transistor ST of the pixel circuit 30 may include the second bottom gate electrode 220, and the first voltage VGH may be also provided to the second bottom gate electrode 220. The display device 1000 may not add an additional voltage source that may provide a back-biasing voltage to the first and second bottom gate electrodes 210 and 220, and the first voltage VGH that may generate the scan signal GW may be provided to the first and second bottom gate electrodes 210 and 220. Therefore, since the display device 1000 may not include the additional voltage source in the non-display area NDA, an unnecessary increase in the size of the non-display area NDA may be prevented. As an example, since the first voltage VGH may be simultaneously provided to the driving transistor DT and the switching transistor ST, the instantaneous afterimage of the display device 1000 including the pixel circuit 30 may not occur, and the reliability of the display device 1000 may be ensured.

Meanwhile, the pixel circuits 10, 20, and 30 in which the driving transistor DT and the switching transistor ST are the PMOS transistors are illustrated in FIGS. 2, 4, and 6, but the pixel circuits 10, 20, and 30 are not limited thereto. For example, a driving transistor DT and a switching transistor ST may be the NMOS transistors. In this case, a first voltage that turns off the switching transistor ST may have the negative voltage level, and a second voltage that turns on the switching transistor ST may have the positive voltage level. In general, in a case that an oxide thin film transistor is the NMOS transistor, if a back-biasing voltage having the negative voltage level is provided to a bottom gate electrode of the oxide thin film transistor, a voltage level of a threshold voltage of the oxide thin film transistor may be moved in the negative direction. For example, as the first voltage having the negative voltage level is provided to the first bottom gate electrode 210 of the driving transistor DT implemented with the NMOS transistor, a voltage level of a threshold voltage of the driving transistor DT may be moved in the negative direction. As an example, as the first voltage having the negative voltage level is provided to the second bottom gate electrode 220 of the switching transistor ST implemented with the NMOS transistor, a voltage level of a threshold voltage of the switching transistor ST may be moved in the negative direction. As the voltage levels of the threshold voltages of the driving transistor DT and/or the switching transistor ST is moved in the negative direction, the display device may have the above-described effects.

The disclosure may be applied to a display device and an electronic device using the display device. For example, the disclosure may be applied to a cellular phone, a smart phone, a video phone, a smart pad, a smart watch, a tablet PC, a vehicle navigation system, a television, a computer monitor, a laptop, for example, within the spirit and the scope of the disclosure.

The foregoing is illustrative of the embodiments and is not to be construed as limiting thereof. Although embodiments have been described, those skilled in the art will readily appreciate that many modifications are possible in the embodiments without materially departing from the novel teachings and advantages of the disclosure. Accordingly, all such modifications are intended to be included within the scope of the disclosure as defined in the claims. Therefore, it is to be understood that the foregoing is illustrative of various embodiments and is not to be construed as limited to the embodiments disclosed, and that modifications to the disclosed embodiments, as well as other embodiments, are intended to be included within the scope of the appended claims.

What is claimed is:

1. A display device, comprising:

a display panel including a plurality of pixel circuits; and a panel driving part that provides a scan signal to the display panel, wherein each of the plurality of pixel circuits comprises:

an organic light emitting diode;

a switching transistor that is turned off when the scan signal has a first voltage and turned on when the scan signal has a second voltage;

a storage capacitor that stores a data voltage provided through a data line when the switching transistor is turned on;

a driving transistor having a gate electrode directly connected to the storage capacitor and a first power electrode directly connected to the switching transistor; and a compensation transistor electrically connected between a second power electrode of the driving transistor and the gate electrode of the driving transistor, the driving transistor includes a first bottom gate electrode that is provided with only a constant voltage equal to the first voltage, the first bottom gate electrode is electrically disconnected from the switching transistor, and the panel driving part includes a gate driver that receives the first voltage and the second voltage to generate the scan signal, the first voltage received by the gate driver is also provided as the constant voltage to an auxiliary voltage line connected to the first bottom gate electrode, and wherein the gate driver receives the first voltage from a first voltage line and the auxiliary voltage line is connected to the first voltage line.

2. The display device of claim 1, wherein the first voltage has a positive voltage level, the driving transistor is a PMOS transistor, and a voltage level of a threshold voltage of the driving transistor is moved in a negative direction when the first voltage is provided to the first bottom gate electrode.

3. The display device of claim 2, wherein the first voltage has a voltage level higher than a voltage level of a high power supply voltage.

4. A display device, comprising:

a display panel including a plurality of pixel circuits; and a panel driving part that provides a scan signal to the display panel, wherein each of the plurality of pixel circuits comprises:

an organic light emitting diode;

a switching transistor that is turned off when the scan signal has a first voltage and turned on when the scan signal has a second voltage, the switching transistor including a second bottom gate electrode that is provided with only a constant voltage equal to the first voltage;

a storage capacitor that stores a data voltage provided through a data line when the switching transistor is turned on;

a driving transistor having a gate electrode directly connected to the storage capacitor and a first power electrode directly connected to the switching transistor; and a compensation transistor electrically connected between a second power electrode of the driving transistor and the gate electrode of the driving transistor, the second bottom gate electrode is electrically disconnected from the driving transistor, and the panel driving part includes a gate driver that receives the first voltage and the second voltage to generate the scan signal, the first voltage received by the gate driver is also provided as the constant voltage to an auxiliary voltage line connected to the second bottom gate electrode, and wherein the gate driver receives the first voltage from a first voltage line and the auxiliary voltage line is connected to the first voltage line.

5. The display device of claim 4, wherein the first voltage has a positive voltage level, the switching transistor is a PMOS transistor, and a voltage level of a threshold voltage of the switching transistor is moved in a negative direction when the first voltage is provided to the second bottom gate electrode.

6. The display device of claim 5, wherein the first voltage has a voltage level higher than a voltage level of a high power supply voltage.

7. A display device, comprising:

a display panel including a plurality of pixel circuits; and a panel driving part that provides a scan signal to the display panel, wherein each of the plurality of pixel circuits comprises:

an organic light emitting diode;

a switching transistor that is turned off when the scan signal has a first voltage and turned on when the scan signal has a second voltage, the switching transistor including a second bottom gate electrode that is provided with only a constant voltage equal to the first voltage;

a storage capacitor that stores a data voltage provided through a data line when the switching transistor is turned on;

a driving transistor having a gate electrode directly connected to the storage capacitor and a first power electrode directly connected to the switching transistor, the driving transistor including a first bottom gate electrode that is provided with only the constant voltage; and a compensation transistor electrically connected between a second power electrode of the driving transistor and the gate electrode of the driving transistor, the first bottom gate electrode is electrically isolated from the switching transistor, and the panel driving part includes a gate driver that receives the first voltage and the second voltage to generate the scan signal, the first voltage received by the gate driver is also provided as the constant voltage to an auxiliary voltage line connected to the first and second bottom gate electrodes, and wherein the gate driver receives the first voltage from a first voltage line and the auxiliary voltage line is connected to the first voltage line.

8. The display device of claim 7, wherein the first voltage has a positive voltage level, the switching transistor and the driving transistor are PMOS transistors, a voltage level of a threshold voltage of the driving transistor is moved in a negative direction when the first voltage is provided to the first bottom gate electrode, and a voltage level of a threshold voltage of the switching transistor is moved in a negative direction when the first voltage is provided to the second bottom gate electrode.

9. The display device of claim 8, wherein the first voltage bas a voltage level higher than a voltage level of a high power supply voltage.

* * * * *